July 21, 1953 G. K. WARE ET AL 2,646,312
SPRINKLER
Filed Oct. 12, 1949 2 Sheets-Sheet 1

INVENTORS
Gordon K. Ware
George J. Filetz
By: Moore, Olson & Trexler
attys.

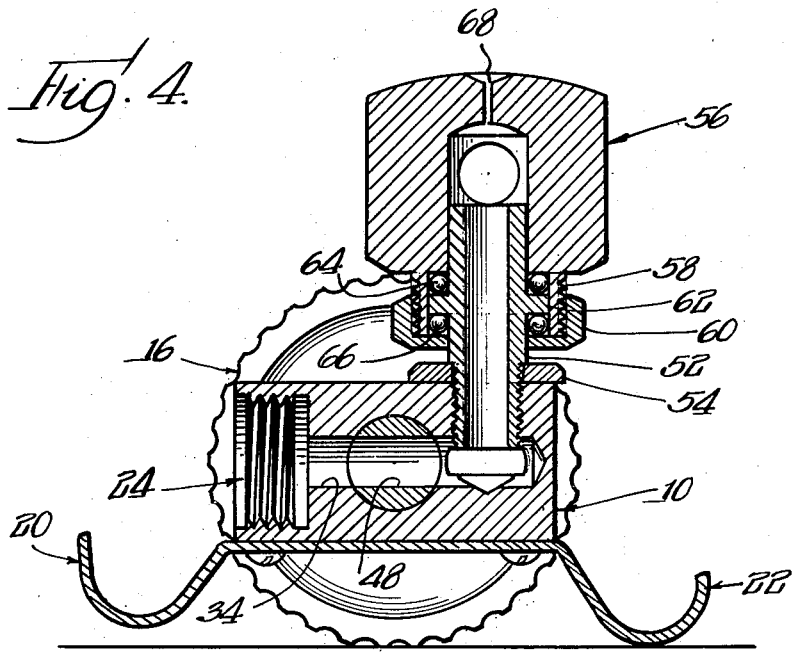
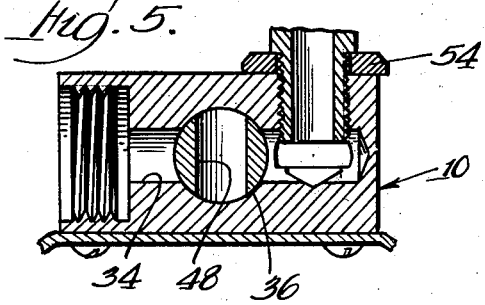
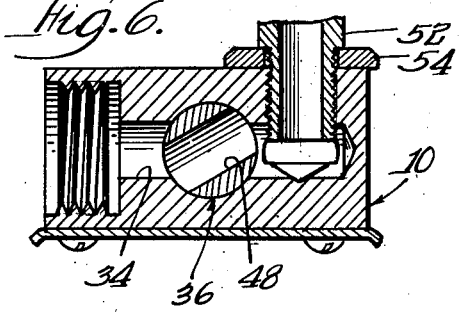
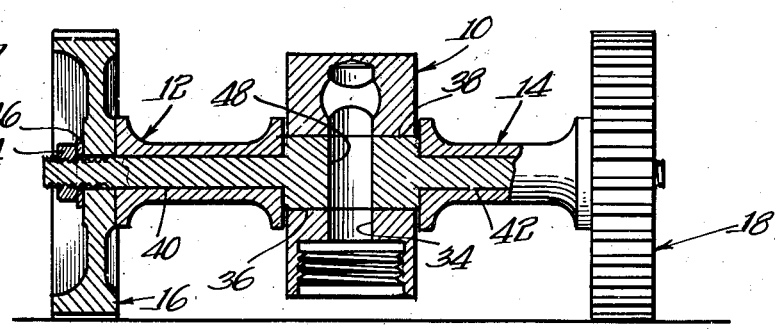

Patented July 21, 1953

2,646,312

UNITED STATES PATENT OFFICE 2,646,312

SPRINKLER

Gordon K. Ware and George J. Filetz, Chicago, Ill., assignors to Chicago Roller Skate Company, Chicago, Ill., a corporation of Arizona Application October 12, 1949, Serial No. 120,868

5 Claims. (Cl. 299—47)

This application is concerned with a lawn sprinkler, and is particularly concerned with a lawn sprinkler the operation of which can be controlled without resort to the faucet or outlet supplying water to the sprinkler.

In watering lawns with a sprinkler, it is generally impossible to water an entire lawn from one sprinkling position. Consequently, it is necessary to move the sprinkler from time to time. For a person to move a lawn sprinkler without being drenched, it is necessary for him to stop the flow of water. Heretofore it has been necessary to do this by closing the valve of the water outlet to which the sprinkler hose is attached. Such water outlets are generally located at a considerable distance from the sprinkler and are usually hidden behind or beneath shrubbery. Usually the shrubbery and surrounding ground have become wet during the sprinkling operation either by being sprinkled directly or, as is frequently the case, by a leak in an imperfect connection between the hose and the water outlet. Consequently, the person shutting off the valve not only has to walk the distance to the valve, from the valve to the sprinkler, and then from the sprinkler back again to the valve, but additionally will get his clothes and person wet and muddy. The same difficulties have been attendant upon controlling the degree of sprinkling, as it has been necessary to follow the same procedure to restart the flow of water.

The primary object of this invention is to obviate the foregoing difficulties.

A more specific object of this invention is the provision of a lawn sprinkler which can be shut off or altered in degree of sprinkling by a tug on the supply hose.

When lawn sprinklers are operated at fairly high water pressures, there is a tendency to force the rotating head away from the body of the sprinkler. When fairly low water pressures are used, the weight of the rotating head exerts a downward force which is greater than the upward force caused by the water and the head is forced toward the body. Thus, some provision must be made for axial thrust in either direction. If an ordinary friction bearing is used, considerable wear is engendered which leads to improper operation of the sprinkler. Furthermore, due to the variance of axial thrust with water pressure, it is impossible to predict the location of greatest wear.

An object of this invention is the provision in a lawn sprinkler of an anti-friction bearing adapted for axial thrust in either direction.

Other and further objects and advantages of the present invention will be apparent from the following description when taken in conjunction with the accompanying drawings in which:

Fig. 4 is a sectional view taken along the line 4—4 in Fig. 2;

Fig. 5 is a fragmentary sectional view similar to Fig. 4 with the valve in a different position;

Fig. 6 is a view similar to Fig. 5 with the valve in another position; and

Fig. 7 is a sectional view taken along the line 7—7 in Fig. 2.

To embody the principles of our invention, we have shown a lawn sprinkler having wheels or rollers disposed substantially parallel to the hose coupling and connected to a valve in the interior of a sprinkler. If it is desired to reduce the flow of water from the sprinkler, a short tug on the hose will move the sprinkler across the lawn and cause the wheels to rotate to partially close the valve. A slightly longer tug will close the valve completely so that the sprinkler will be shut off and may be picked up for movement to another location. At this point, a further tug on the hose will open the valve partially or entirely depending upon the length of the tug.

Figure 1:
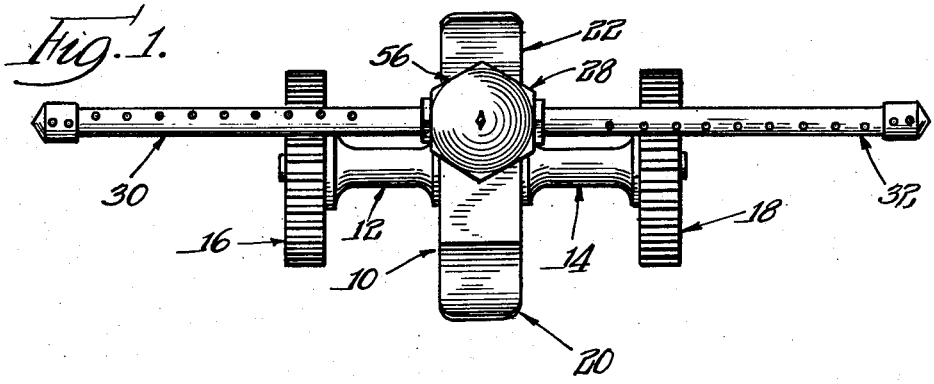
Fig. 1 is a top plan view of a sprinkler embodying our invention.
Figure 2:
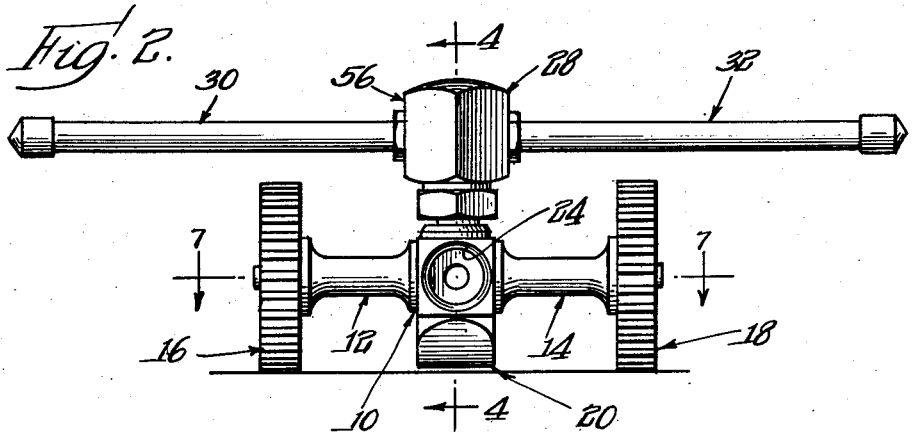
Fig. 2 is a front elevational view of the same.
Figure 3:
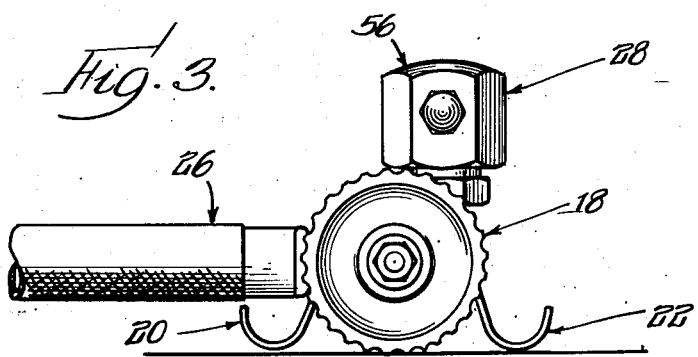
Fig. 3 is a side view.

As seen generally in Figs. 1 through 3, the sprinkler embodying our invention comprises a body portion 10 having transversely extending axles 12 and 14 on which are mounted wheels 16 and 18. A pair of tongues 20 and 22 extending downwardly and longitudinally of the body portion act with the wheels to maintain the sprinkler in an upright position. A female hose coupling 24 is provided in the front end of the body, and in Fig. 3 a hose 26 is shown coupled thereto. A rotatable sprinkler head, generally designated by the numeral 28, is carried atop the body portion and has extending arms 30 and 32 apertured in the usual manner to eject water in a spray and cause rotation of the head by the repulsive effect of the sprayed water.

Referring particularly to Figs. 4–7 for the details of construction, the body portion 10 will be seen to have a longitudinal bore 34 opening to the hose coupling 24. A valve 36 is transversely disposed through the bore 34 and comprises a cylinder 38 having axially extending spindles 40 and 42. In Fig. 7 the cylinder 38 may be seen to extend slightly beyond the sides of the body portion 10 so that the inner edges of the previously identified axles 12 and 14 do not clamp against the body portion when these axles are placed over the spindles 40 and 42. The wheels 16 and 18 are preferably knurled peripherally to provide a non-slip contact with the ground and are clamped against the axles 12 and 14 as by a nut 44 and washer 46 seen in Fig. 7, to force the ends of the axles 12 and 14 against the ends of the cylinder 38. The cylinder 38 will thus rotate with the wheels 16 and 18, and is provided with a transverse bore 48 which is alignable with the bore 34 for the passage of water. In Fig. 4 the tongues 20 and 22 previously referred to will be seen to be integral extensions of a strip 50 secured to the bottom of the body portion 10 by any suitable means such as screws.

Adjacent the inner end of the bore 34, an upwardly extending transverse bore is provided and into this is threaded a hollow shaft 52. A washer 54 may be clamped against the top of the body portion 10 by the shaft 52. The rotatable head 28 is carried atop the shaft 52 and comprises a nut 56 which is axially apertured from near the top to the bottom to fit over the hollow shaft 52, and is transversely apertured to provide a connection between the arms 30 and 32 and the interior of the hollow shaft 52. The nut 56 has a downwardly extending, angular, threaded flange 58 on which is threaded a nut 60. The hollow shaft 52 is provided with a radially extending annular flange 62 which fits within the depending flange 58 of the nut 56. A plurality of ball bearings 64 are interposed between the top surface of the flange 62 and the nut 56 to take up downward axial thrust, and a plurality of ball bearings 66 are interposed between the bottom surface of the flange 62 and the nut 60 to take up upward axial thrust. If it is desired, the nut 56 may have a small spray aperture 68 extending upwardly from its axial bore.

As seen in Fig. 4, the bore 48 of the valve 36 is aligned with the axial bore 34 of the body portion 10. Water enters from the hose, passes through the bores 34 and 38 upwardly through the hollow shaft 52 and outwardly into the arms 30 and 32 from whence it is dispersed through the apertures provided. If it is desired to move the sprinkler, it can be readily shut off without going to the valve controlling the water source by pulling on the hose sufficiently to cause the wheels 16 and 18 to rotate a quarter of a turn. The rotation of the wheels causes the valve 36 to rotate into the position shown in Fig. 5. The bore 34 is thus effectively cut off and no water flows through the sprinkler. The sprinkler may then be moved to any location and a further pull on the hose will rotate the wheels and valve 36 so that it may be returned to fully opened position, as shown in Fig. 4. If it is desired to reduce the flow of water, a similar procedure is followed except that the hose is not pulled so far. A very short pull on the hose will cause the wheels to rotate less than a quarter of a turn and the valve will be rotated to some position between fully opened and fully closed, such as the half opened position shown in Fig. 6. The flow of water and the area covered can thus be restricted to any desired degree by merely pulling on the hose. If the water is shut off too far, a continued pull on the hose will rotate the valve through the fully closed position shown in Fig. 5 and into a partially opened position on the other side thereof.

It is apparent that we have herein presented a lawn sprinkler having a valve which may be closed partially or completely by a pull on the hose supplying water to the sprinkler to reduce or stop the flow of water therefrom. It is further apparent that we have provided a novel anti-friction bearing in the mounting of a rotatable sprinkler head which is adapted to withstand axial thrust in either direction and which will significantly reduce wear and prolong the life of the sprinkler.

Although we have shown and described a certain preferred embodiment of our invention, it is apparent that this particular embodiment has been shown and described for illustrative purposes only and our invention is not to be limited thereto. It is to be understood that our invention includes all that which fairly may fall within the appended claims.

We claim:

1. A lawn sprinkler of the type supplied with water by a hose and usable on a fixed surface, said sprinkler comprising a body portion, valve means carried by said body portion and operable by relative movement of said hose and said supporting surface, an upstanding shaft on said body portion, a substantially radial annular flange on said shaft, a rotatable sprinkler head fitting over said shaft and extending downwardly beyond said flange, means carried by said shaft below said flange and secured to said rotatable sprinkler head for rotation therewith, anti-friction bearing means disposed between said last named means and said flange and holding said head on said shaft, and anti-friction bearing means disposed directly between said flange and said rotatable sprinkler head and supporting the weight of said head.

2. A lawn sprinkler comprising a longitudinally apertured body portion, valve means comprising a transversely apertured cylinder disposed transversely with regard to the longitudinal aperture of said body portion, the ends of said cylinder extending beyond the sides of said body portion, axle means extending from said cylinder, a plurality of wheels fixed on opposite ends of said axle means, means for precluding rotation between said cylinder and said wheels to rotate said cylinder upon rotation of said wheels, a hose coupling in the same horizontal plane as said cylinder, and means extending downwardly and forwardly and rearwardly from said body portion to maintain said sprinkler in an upright position.

3. A portable lawn sprinkler comprising a body portion provided with communicating longitudinal and transverse apertures, valve means including a radially apertured cylinder rotatably fitting within the transverse aperture in said body portion and extending from said body portion on both sides, the radial aperture in said valve portion being alignable with the longitudinal aperture in said body portion, axially extending shafts on said valve cylinder, roller means on the ends of said shafts, axle members clamped between said roller means and said valve cylinder, the inner ends of said axle members being of greater diameter than said valve cylinder, a hose connection axially aligned with said longitudinal aperture in said body portion, stabilizing brace means extending downwardly and forwardly and rearwardly from said body portion, said body portion further having a substantially vertical aperture communicating with the longitudinal aperture, an upstanding hollow shaft secured in said vertical aperture, a substantially radial annular flange on said shaft, a rotatable sprinkler head fitting over said shaft and extending beyond said flange, a retaining flange on said sprinkler head extending radially inwardly below the flange on said shaft, antifriction bearing means disposed between the head flange and the shaft flange, and anti-friction bearing means disposed between said shaft flange and the rotatable sprinkler head thereabove.

4. A lawn sprinkler comprising a body portion having a channel therethrough, said body portion having a transverse cylindrical aperture, a valve member comprising a diametrically apertured cylinder rotatably fitting within said cylindrical aperture and extending outwardly from opposite sides of said body portion, the aperture in said valve cylinder being alignable with the channel in said body portion for forming a continuous conduit therewith, axle members extending coaxially from the opposite ends of said valve cylinder and of reduced diameter relative to said valve cylinder, roller members on said axle members on opposite sides of said body portion, spacer members on said axle members between said roller members and said valve cylinder and having greater diameters at the ends adjacent the body portion than said valve cylinder and said cylindrical aperture, means for clamping said roller members against said spacer members on said axle members, and a sprinkler head on said body portion in communication with said channel.

5. A portable lawn sprinkler comprising a body portion provided with communicating longitudinal and transverse apertures, valve means including a radially apertured cylinder rotatably fitting within the transverse aperture in said body portion and extending from said body portion on both sides, the radial aperture in said valve portion being alignable with the longitudinal aperture in said body portion, axially extending shafts on said valve cylinder, roller means on the ends of said shafts, axle members clamped between said roller means and said valve cylinder, the inner ends of said axle members being of greater diameter than said valve cylinder, a hose connection axially aligned with said longitudinal aperture in said body portion, stabilizing brace means extending downwardly and forwardly and rearwardly from said body portion, said body portion further having a substantially vertical aperture communicating with the longitudinal aperture, an upstanding hollow shaft secured in said vertical aperture, a substantially radial annular flange on said shaft, a rotatable sprinkler head fitting over said shaft and extending beyond said flange, a retaining flange on said sprinkler head extending radially inwardly below the flange on said shaft, friction reducing means disposed between the head flange and the shaft flange, and friction reducing means disposed between said shaft flange and the rotatable sprinkler head thereabove.

GORDON K. WARE.
GEORGE J. FILETZ.

References Cited in the file of this patent
UNITED STATES PATENTS

| Number | Name | Date |
|---|---|---|
| 715,005 | Blair | Dec. 2, 1902 |
| 1,167,629 | Coles | Jan. 11, 1916 |
| 1,760,588 | Eby | May 27, 1930 |
| 2,269,882 | Pattison | Jan. 13, 1942 |
| 2,297,052 | Ferrando | Sept. 29, 1942 |
| 2,566,856 | Rose | Sept. 4, 1951 |